F. A. HOWARD.
ATTACHMENT FOR AUTOMOBILES.
APPLICATION FILED NOV. 18, 1910.
1,016,631.
Patented Feb. 6, 1912.
2 SHEETS—SHEET 1.
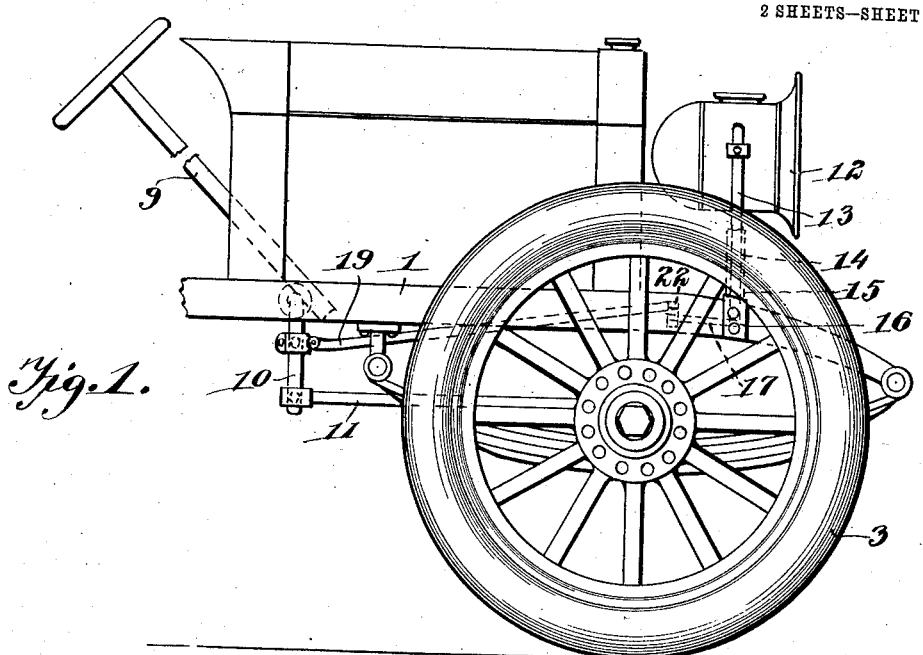
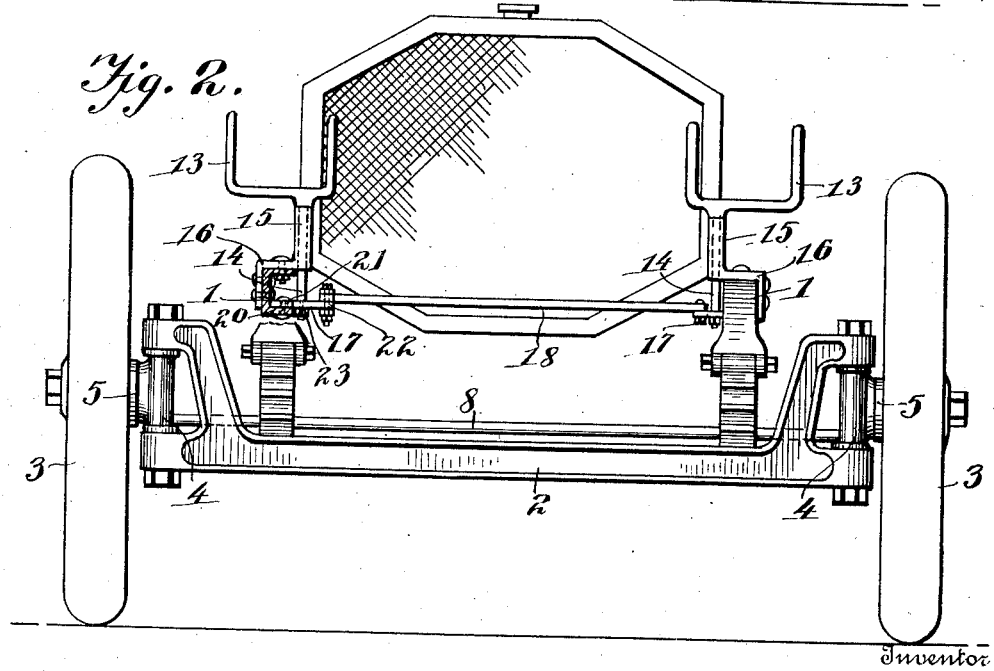
Witnesses
William C. Linton.
H. S. Austin
Inventor
Frederick A. Howard.
By Joshua R. H. Potts.
Attorney

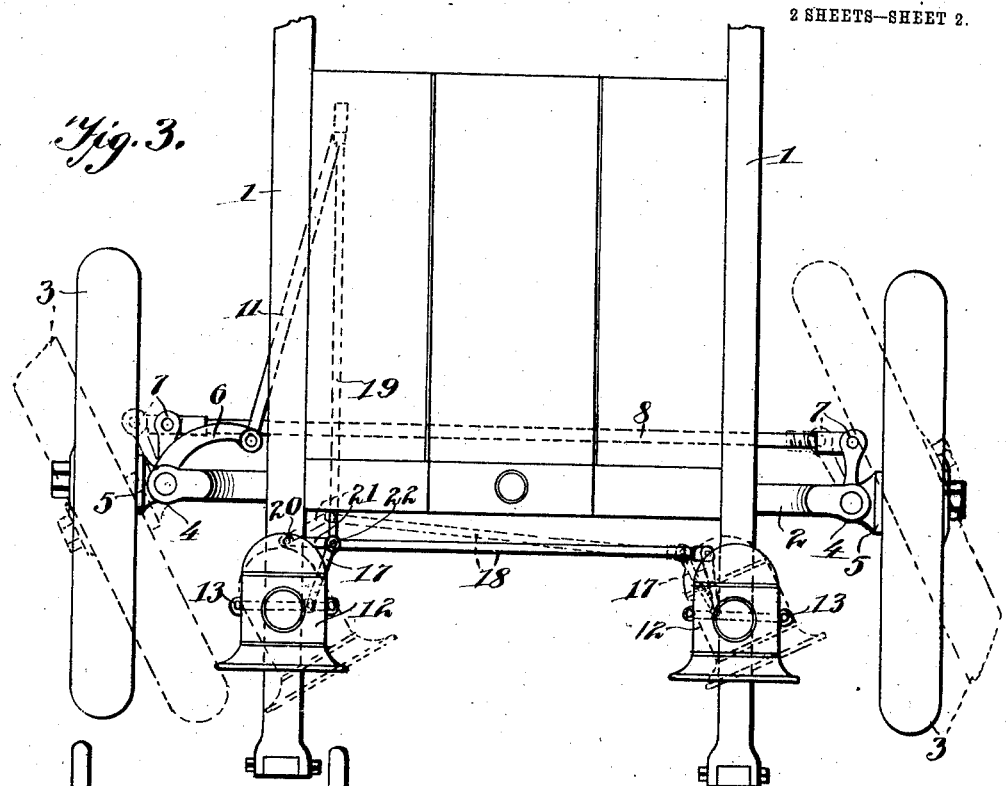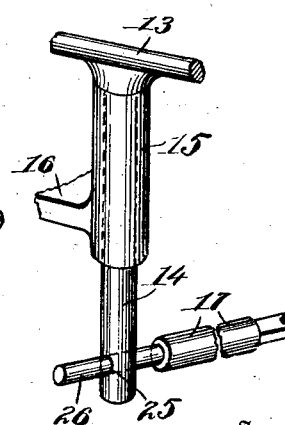

UNITED STATES PATENT OFFICE.

FREDERICK A. HOWARD, OF CHESTER, PENNSYLVANIA.

ATTACHMENT FOR AUTOMOBILES.

1,016,631.     Specification of Letters Patent.     Patented Feb. 6, 1912.

Application filed November 18, 1910. Serial No. 593,008.

*To all whom it may concern:*

Be it known that I, FREDERICK A. HOWARD, a citizen of the United States, residing at Chester, county of Delaware, and State of Pennsylvania, have invented certain new and useful Improvements in Attachments for Automobiles, of which the following is a specification.

My invention relates to automobiles and particularly to attachments for automobiles whereby the pilot lights are shifted simultaneously with the change of direction of the front wheels to cause the lights to illuminate the path to be immediately traversed by the vehicle.

The object of my invention is to provide improved means for simultaneously shifting or turning the pilot lights of an automobile and the front wheels thereof in order that the path immediately in front of the automobile shall be constantly illuminated.

A further object of my invention is to provide a device of the character mentioned, operable from the steering wheel, and which shall not require any appreciable additional force to operate.

Other objects will appear hereinafter.

With these objects in view my invention consists generally in pivotally mounting the pilot lamp on the frame of the vehicle and providing the same with a crank arm or lever which is connected to the steering mechanism so that the lamps will be turned simultaneously with the turning of the front wheels, and providing the device with a link connection between the frame and said arm or lever for relieving the device of any strain or requiring additional force to operate the same.

My invention further consists in a novel connection between the lamp pivot and the crank arm, and in various other details of construction and arrangements of parts all as will be fully described hereinafter and particularly pointed out in the claims.

My invention will be more readily understood by reference to the accompanying drawings forming a part of this specification and in which—

Figure 1 is a side elevation of the forward part of an automobile equipped with a device embodying my invention in its preferred form, Fig. 2 is a front elevation thereof, Fig. 3 is a plan view of the same, Fig. 4 is a perspective view upon an enlarged scale illustrating the lamp bracket and connections, and Fig. 5 is a similar view illustrating a modified form of connection between the lamp bracket and the lever or arm.

Referring now to the drawing 1 indicates the chassis of an automobile, 2 the front axle, 3 the front wheels and 4 the knuckle joint between the axle and the wheels. The stub shaft 5 of one of the wheels is provided with the usual steering arm 6 and each is provided with the short arm 7 connected by the rod 8.

9 indicates the usual steering wheel operably connected to the steering arm 10 in any suitable manner such as the ordinary worm and gear, and 11 indicates the rod extending from the arm 10 to the steering arm 6.

While in the above I have described a particular form of steering mechanism for an automobile, it is to be understood that the steering device may partake of any of the usual forms as said steering mechanism by itself forms no portion of my invention but only when in combination with the parts described hereinafter.

12—12 indicate the pilot lamps mounted upon brackets 13, said brackets being provided with vertical stems 14 pivotally mounted in a sleeve 15 formed on a bracket 16 secured to the chassis 1. The lower end of the stem 14 of each lamp is provided with a rearwardly extending arm or lever 17 which arms are connected by a transverse rod 18 so that as one lamp is turned the other lamp will be turned simultaneously therewith. The end of one of the arms 17 is connected by a rod 19 to the steering arm 10. It is obvious that as the steering mechanism is operated, the lamps will be turned to throw the light in the path which the automobile is to travel.

Pivotally connected to the chassis 1, as at 20 is a link 21, the free end of which is pivotally connected as at 22 with the end of the arm 17. This construction prevents the formation of dead centers between the arm 17 and rod 19 thereby avoiding uneven or an appreciable additional strain on the steering mechanism. On account of the eccentricity of the stem 14 and pivot 20, a sliding connection is provided between the arm or lever 17 and the stem 14, and in Figs. 4 and 5 I have illustrated two forms of such connection. In Fig. 4 the end of the stem is flattened as at 23 and the arm 17 is provided with a slot 24 to receive the flattened portion, whereby the arm 17 may slide freely on the stem and still impart a rotary motion thereto. If preferred the stem 14 may be provided with a transverse aperture 25 through which the end 26 of the arm 17 may freely slide, as shown in Fig. 5, in which instance the end of the rod is preferably cylindrical and reduced in diameter as illustrated.

In operation the lamp next to the link 21 will always turn in the direction in which the wheels turn to illuminate the path directly in front of the machine, while the other lamp will turn in one direction only.

Having described my invention what I claim as new and desire to secure by Letters Patent is:

1. In an automobile, the chassis, and steering mechanism, in combination with a lamp bracket having a vertical stem, a bracket on said chassis, said stem being rotatably mounted in said bracket, an arm on said stem, a rod connecting said steering mechanism and said arm and a link pivotally connected to said chassis and said arm, substantially as described.

2. In an automobile, the chassis and steering mechanism, in combination with a bracket on said chassis, a lamp bracket having a vertical stem rotatably mounted in said bracket, an arm slidably and rotatably connected with said stem, a rod connecting said arm and said steering mechanism and a link pivotally connected to said frame and also connected to said arm at the pivotal point between said arm and said rod, substantially as described.

In testimony whereof I have signed my name to this specification in the presence of two subscribing witnesses.

FREDERICK A. HOWARD.

Witnesses:
 CHARLES PALMER,
 CARRIE L. JONES.

---

Copies of this patent may be obtained for five cents each, by addressing the "Commissioner of Patents, Washington, D. C."